(No Model.) 2 Sheets—Sheet 1.
J. D. ROSS & E. WESTCOTT.
COOKING UTENSIL.
No. 472,002. Patented Mar. 29, 1892.
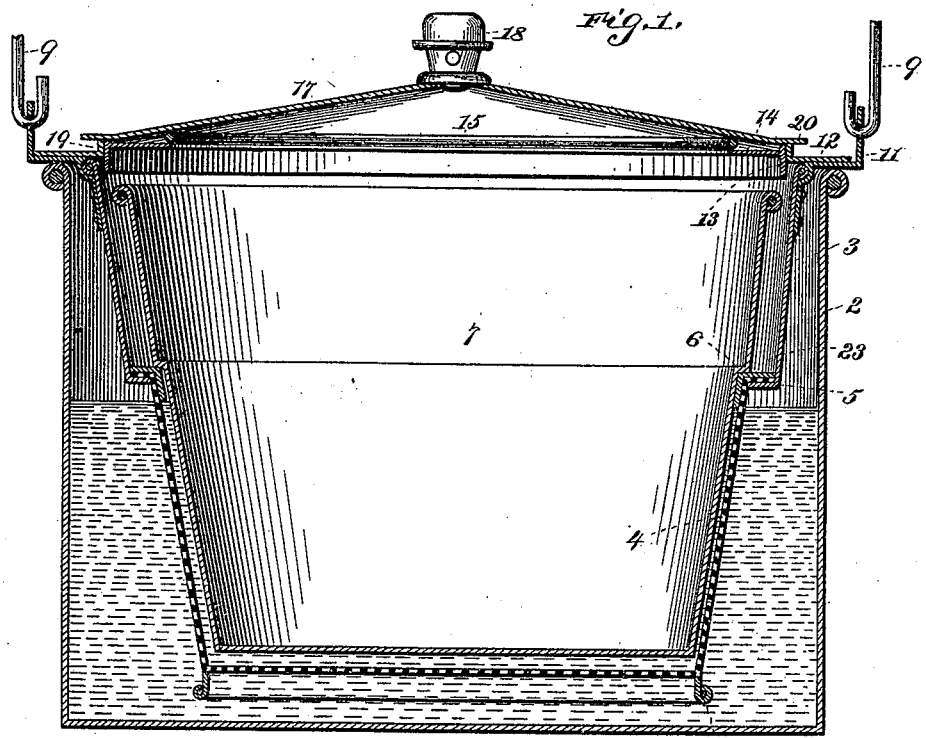
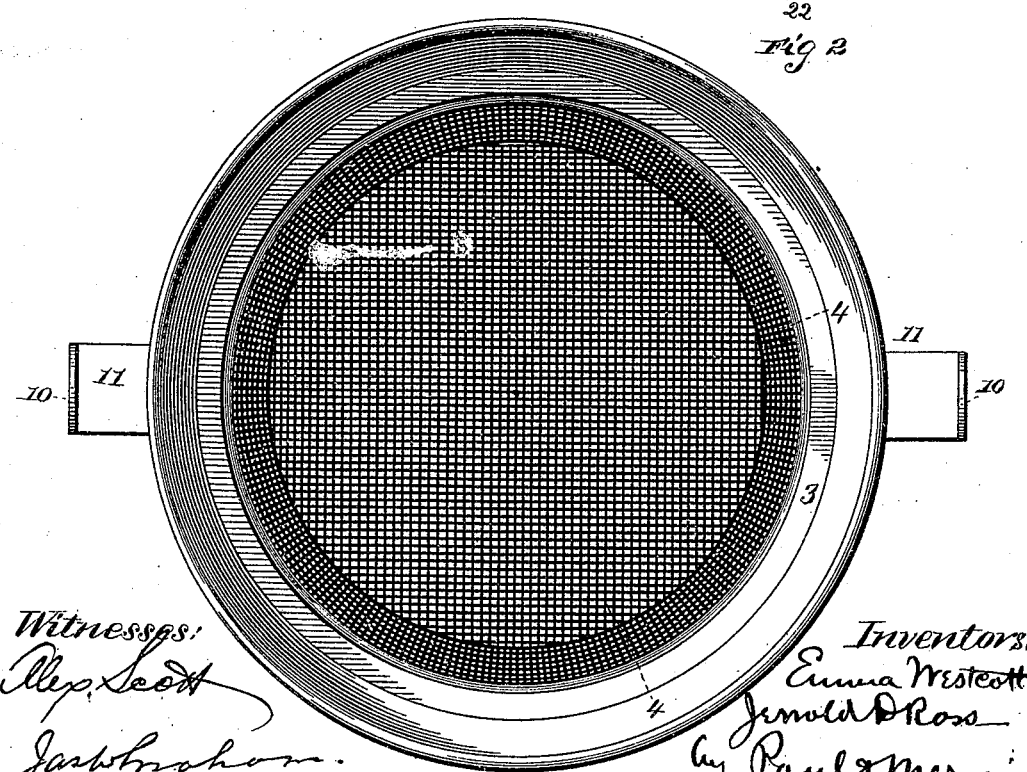

(No Model.) 2 Sheets—Sheet 2.
J. D. ROSS & E. WESTCOTT.
COOKING UTENSIL.
No. 472,002. Patented Mar. 29, 1892.
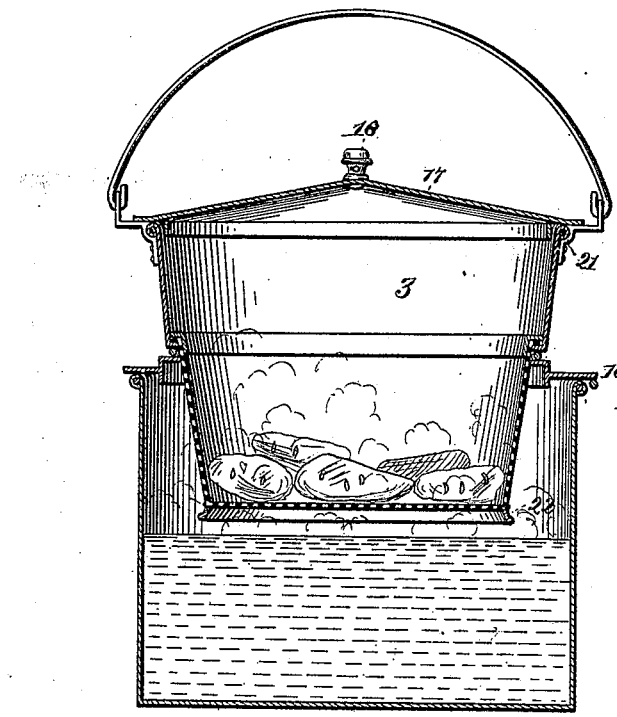
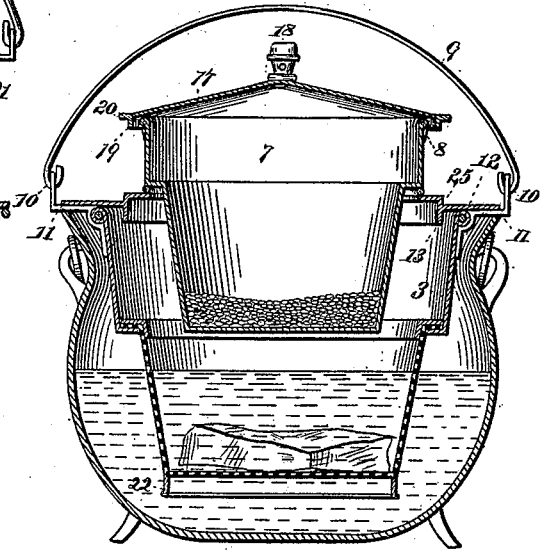
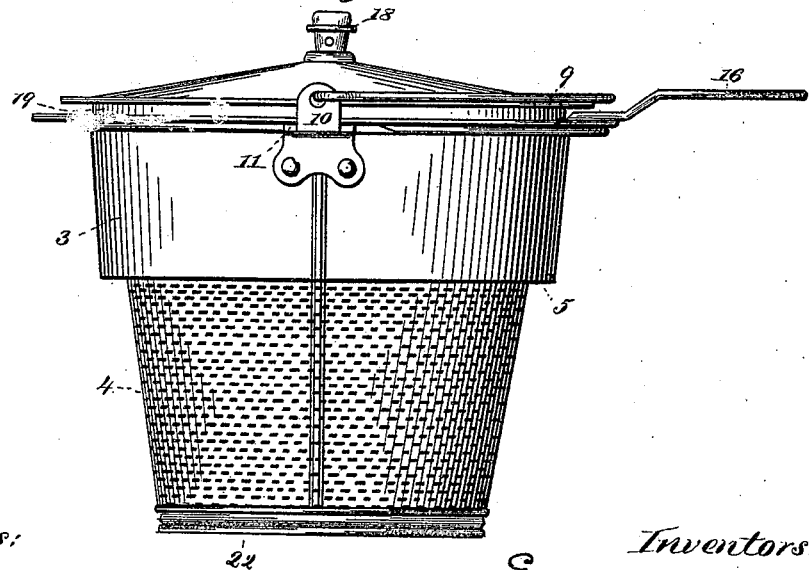
Witnesses:
Inventors:
Emma Westcott
Jerrold D. Ross
by Paul T. Merwin
Attys.
THE NORRIS PETERS CO., PHOTO-LITHO., WASHINGTON, D. C.

UNITED STATES PATENT OFFICE.

JERROLD D. ROSS, OF MINNEAPOLIS, AND EMMA WESTCOTT, OF BROWER-VILLE, MINNESOTA; SAID WESTCOTT ASSIGNOR OF ONE-HALF OF HER RIGHT TO SAID ROSS.

COOKING UTENSIL.

SPECIFICATION forming part of Letters Patent No. 472,002, dated March 29, 1892.

Application filed March 30, 1891. Serial No. 387,076. (No model.)

*To all whom it may concern:*

Be it known that we, JERROLD D. ROSS, of Minneapolis, in the county of Hennepin and State of Minnesota, and EMMA WESTCOTT, of Browerville, in the county of Todd and State of Minnesota, have invented certain Improvements in Cooking Utensils, of which the following is a specification.

The invention relates to a combination cooking utensil adapted for a great variety of uses in boiling, steaming, or heating articles of food; and the object is to provide a utensil consisting of a number of separable parts adapted to be combined in various ways to take the place of a large number of separate utensils used for the several purposes for which our utensil may be applied.

The invention consists in a vessel having perforated walls and adapted to be placed within a suitable pan, dish, or kettle, with means for supporting said perforate vessel in the same, an inset vessel or bucket having imperforate walls adapted to set within the first-named vessel, a lid or cover for said vessels, and a separable rim adapted to support said lid or said vessels.

Our invention further consists in various details of construction and combination hereinafter described, and particularly pointed out in the claims.

Our invention will be more readily understood by reference to the accompanying drawings, in which—

Figure 1 is a vertical section of a utensil embodying our invention. Fig. 2 is a plan view of the perforated vessel. Fig. 3 is a general elevation of the device. Figs. 4 and 5 illustrate two uses of the utensil.

As shown in the drawings, the utensil proper is adapted to be placed within the main pan or kettle 2, the bottom of which is exposed to the heat of the fire, and in which the desired amount of water is placed. The larger vessel 3 of the utensil is provided with perforations in its bottom and in the lower half of its walls. These portions of the vessel 3 are preferably made up of perforated sheet-tin 4, but may consist of fine-mesh wire cloth or screening or other suitable perforated substance adapted to allow the water free passage to the interior of the vessel 3, as shown in Figs. 1 and 4. The shoulder 5 is provided in the wall of the vessel 3 and is adapted to engage the shoulder 6 of the inset vessel 7 to support the same. The inset vessel 7 and the vessel 3 are both provided with bails 8 and 9, respectively, by means of which the same may be lifted. The bail 9 is secured to the upturned portions 10 of the ears 11, secured on the vessel 3 and of such length as to engage the tops of different-sized kettles. The separable rim consists of the flat ring 12, provided with the flange 13, projecting above and below the same and having its upper edge formed in connection with the extension-ring 14, having the strengthening rib or wire 15 about its inner circumference, which is of a size to fit outside the perforated vessel and engage the shoulder 5. The ring 12 is of such width as to form with the lid 17 a complete cover for the kettle. The handle 16 is provided in connection with the separable rim, so that the same may be lifted easily. The cover or lid 17 is provided with a lifting-knob 18 and with a depending collar 19, fitting the outside of the flange 13 on the separable rim. The cover is provided with the circumferential flange 20, of sufficient width to engage the upper edge 21 of the vessel 3 when the rim is removed. At this time the flange 19 would set down inside of the vessel 3. A strengthening collar or flange 22 is provided around the bottom of the perforated vessel 3 to prevent damage thereto by bruising. As shown, the shoulder 5 of the vessel 3 is made by a flange turned in from the solid portion of the walls of the same, and over which the perforated material is secured. An annular angle-strip 23 is provided around the shoulder to protect the joint and give the same a neat appearance.

In Fig. 4 the cooking utensil is shown in use in an ordinary kettle, the vessel 3 being set down in the water therein. The inset 7 is supposed to contain articles which have been thoroughly boiled and which it is desired to keep warm. Hence instead of removing the inset entirely the "separable rim" 25 (as all the parts thereof taken together may be called) is placed on the top of the vessel 3 and the inset set down through the opening of the rim, its shoulders resting upon the inner edges thereof, as shown. The cover or lid 17 is placed over the top of the inset to prevent the escape of heat, the rim 19 on the cover being large enough to embrace the outside of the inset-top. Thus it will be seen that while one article of food—such as meat—is being boiled in the kettle other things—such as beans or mush—may be kept warm without contact with the boiling water in the kettle. Suppose that, the meat having been cooked, it is desired to remove the same from the kettle. All that is necessary is to raise the vessel 3 by its bail, thus lifting the meat out of the water and allowing all of the liquid to drain back into the kettle. In this way it may be seen that thin meat soups may be cooked and the stock afterward completely removed from the same, as is desirable in consommé soups. If it is desired to allow the liquid time to drain out of the vessel 3, the same may be supported above the water in the kettle, as shown in Fig. 5, by placing the rim on the kettle-top and lowering the perforated bottom of the vessel 3 through the opening in the same. In use the separable rim always rests on the kettle-top. In this position the vessel 3 may be used as a steamer. It will be seen that a cooking utensil is thus provided which is adapted for a great number of uses, it being possible to cook all the large articles which should be exposed directly to the water in the perforated vessel or to steam such articles therein when the vessel is raised into the position shown in Fig. 5. Upon the other hand, all small articles which would soon boil to pieces if placed directly in the perforated vessel may be cooked in the inset—as, for instance, sauces, berries, jellies, soft fruits, or cereals.

Having thus described our invention, we claim as new and desire to secure by Letters Patent—

1. The combination of the vessel 3, having the lower portions of its walls and its bottom perforated, with the shoulder 5, lugs 11, the cover 17, and the separable rim having the central opening, the edges of which are adapted to engage said shoulder 5, substantially as described.

2. The combination, in a cooking utensil, of the vessel 3, having its walls and bottom perforated, with the shoulder 5, the inset vessel 7, having the shoulder 6, the separable rim provided with a handle and with a central opening, a flange on said rim, and a cover adapted to fit said rim and vessels, substantially as described, and for the purpose specified.

3. The combination, in a cooking utensil, of the vessel 3, having the perforated portions, and the lugs 11, engaging the bail 9, with the inset vessel 7, also having a bail, said inset vessel 7 provided with shoulders 6 and said vessel 3 provided with the depending flange 19, the ring 12, the ring 14, the flange 13, making up the separable rim, and a handle 16, provided on said separable rim, substantially as described.

In testimony whereof we have hereunto set our hands.

Signed at Minneapolis, in the county of Hennepin, in the State of Minnesota, on the 26th day of February, 1891.

JERROLD D. ROSS.

In presence of—
  L. C. LOWRY,
  D. C. MATTESON.

Signed at Browerville, in the county of Todd, in the State of Minnesota, on the 28th day of February, 1891.

EMMA WESTCOTT.

In presence of—
  ROSANA POLLY,
  JOSHUA SARFF.